Patented Jan. 15, 1929.

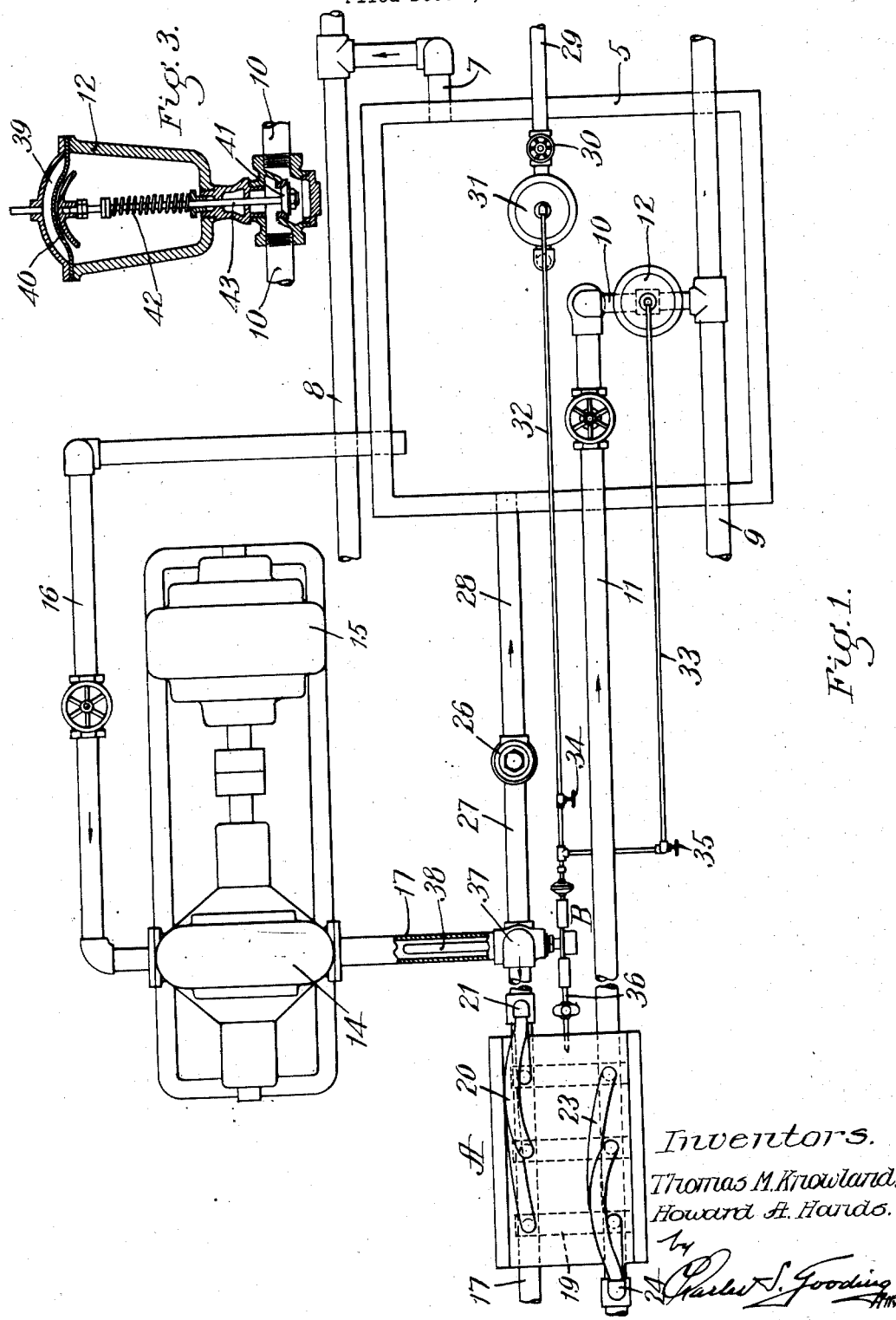

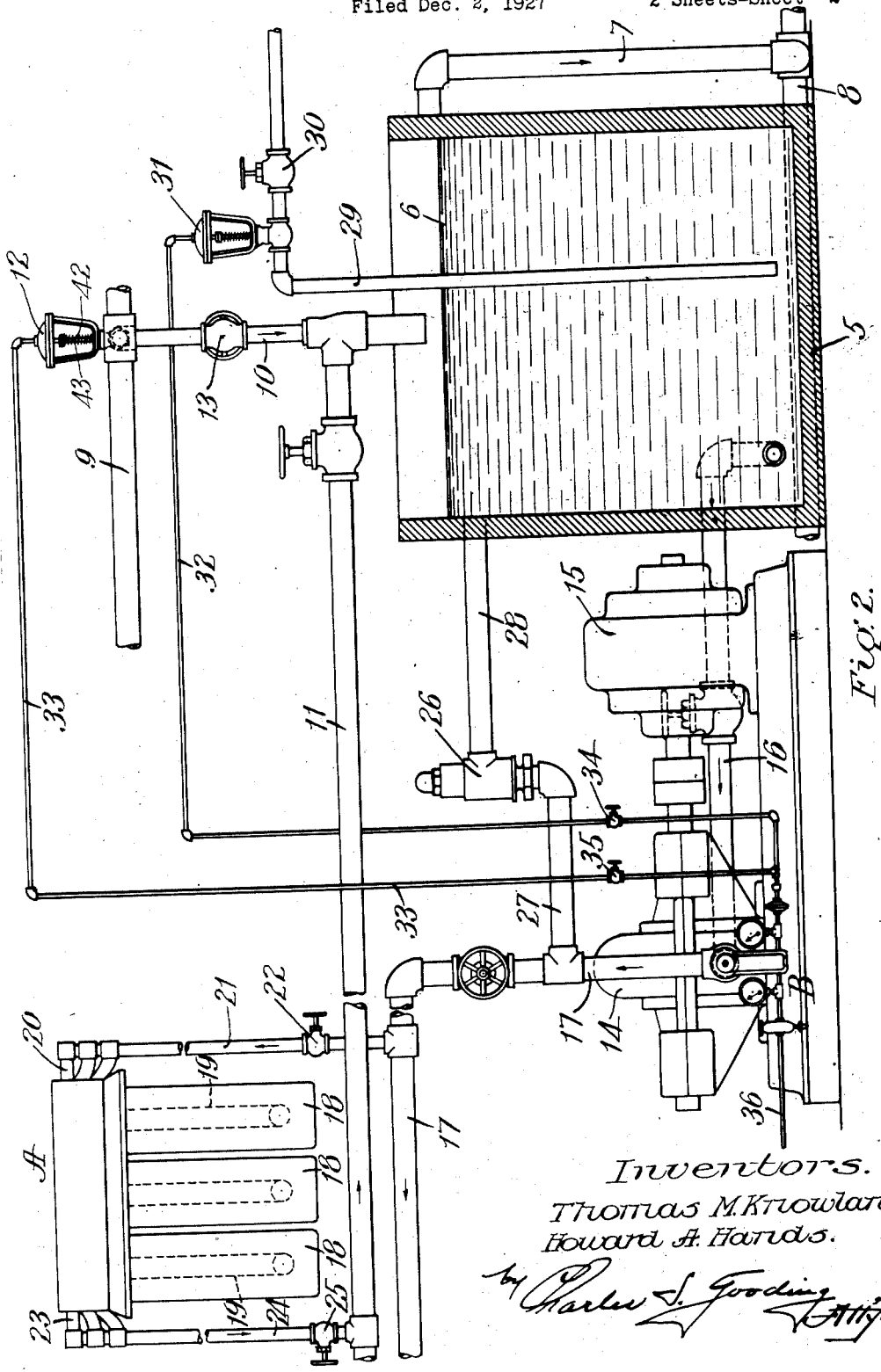

1,699,296

UNITED STATES PATENT OFFICE.

THOMAS M. KNOWLAND AND HOWARD A. HANDS, OF WATERTOWN, MASSACHUSETTS, ASSIGNORS TO HOOD RUBBER COMPANY, OF WATERTOWN, MASSACHUSETTS, A CORPORATION OF MASSACHUSETTS.

TEMPERATURE-REGULATING APPARATUS.

Application filed December 2, 1927. Serial No. 237,321.

This invention relates to an apparatus for regulating the temperature of mandrels, or any other device or machine that it is desired shall be maintained at a constant temperature.

In the making of cold pressed battery boxes the internal contour of the box is formed by a three-piece mandrel. In order to form a surface free from marks, and in order to make certain that the mandrel will free itself from the surrounding matrix, it is necessary to maintain the mandrel at a constant temperature. Heretofore the temperature of the mandrel has been usually a matter of chance, as all regulating of said temperature has been effected by a stream of water, which may vary greatly in temperature and which is sure to over cool during temporary shut-downs of the press.

It is an object of this invention to provide an apparatus, preferably utilizing water as the temperature regulating medium, said apparatus embodying therein a means for maintaining the regulating medium at approximately constant temperature.

The invention consists in an apparatus as set forth in the following specification and particularly as pointed out in the claims thereof.

Referring to the drawings:

Figure 1 represents a plan view of a temperature regulating apparatus embodying our invention, the drawing being somewhat diagrammatic in character.

Fig. 2 is a front elevation of the apparatus, also somewhat diagrammatic in character.

Fig. 3 is an enlarged central vertical section through one of the automatically operated diaphragm valves employed in the apparatus.

Like numerals refer to like parts in the several views of the drawings.

In the drawings, 5 represents a container for a temperature regulating liquid, preferably water, which is maintained at a uniform level indicated at 6 in Fig. 2, by providing an overflow pipe 7 through which said water may escape into a drain 8. The water for the container 5 is supplied from a pipe 9, which may be the city service pipe, through a branch pipe 10 which connects with a main outlet pipe 11, through which the water from the devices to be regulated is returned to the container 5.

An automatically operated diaphragm valve 12 of well-known construction, see Fig. 3, the operation of which will hereinafter be more fully explained, is located in the branch pipe 10 as is also a hand operated shut-off valve 13.

The water is withdrawn from the container 5 by a pump 14 operated by a motor 15 through a pipe 16 and is then forced by said pump through an inlet main 17 to the device to be regulated which, in this instance, is a mandrel A of a mold for battery boxes. The mandrel A may be of any suitable construction, but in this instance embodies therein a plurality of forming members 18, each provided with a water passage 19, through which water may circulate, and one end of each of said passages is connected by a flexible connection 20 with a branch inlet pipe 21 which connects with the inlet main 17. A hand operated valve 22 is provided for the branch pipe 21. The discharge end of the water passages 19 are connected by flexible connections 23 with an outlet branch pipe 24 which, in turn, discharges into the outlet main 11, a hand-operated valve 25 being provided for the branch pipe 24.

A means for relieving excessive water pressure in the inlet main 17, between the pump 14 and the mandrel A, is provided, which consists of a pressure relief valve 26 of well-known construction, said valve being connected by a pipe 27 with the inlet main 17 and by a pipe 28 with the water container 5.

It is evident that the temperature of the liquid within the container 5 may vary greatly at different seasons of the year. For example, in winter the water admitted to the container through the supply pipe 9 may be many degrees cooler than in the summer and other conditions may exist which will affect the temperature of the water throughout the system. It has, therefore, been found desirable in maintaining the water at a constant temperature under all conditions to provide a means for supplying heat to said water and this is accomplished by providing a steam pipe 29 which will discharge steam into the water at a point adjacent to the bottom of the container 5. The pipe 29 is provided with a hand-operated valve 30 and an automatically operated diaphragm valve 31. The valve 31 is connected by a pipe 32 with a temperature control mechanism B, and in like manner the valve 12 of the pipe 10 is connected by a pipe 33 with the control mechanism B. Valves 34 and 35 are provided for the pipes 32 and 33 respectively. A pipe 36 conducts a pressure fluid, preferably compressed air, from a suitable supply to the control mechanism B.

The temperature control mechinism B is of a well-known type and is mounted in a T 37 of the inlet pipe 17 in a manner to expose a sensitive member or bulb 38 to the water circulating within the system. Within the bulb 38 is a suitable volatile fluid which expands and contracts as influenced by the temperature of the water within the pipe 17. The expansion or contraction of the fluid within the bulb 38 causes a valve, not shown, within the control mechanism B to function and thereby control the passage of compressed air from the pipe 36 to the diaphragm valves 12 and 31, through the pipes 33 and 32 respectively, as permitted by the valves 35 and 34.

The valve 12, which is of a type well known to those skilled in the art, is illustrated in detail in Fig. 3 and embodies therein a diaphragm chamber 39, beneath which is a diaphragm 40 adapted to operate a valve member 41 against the pressure of a spring 42 surrounding a valve stem 43.

The valves 12 and 31 are similar in construction except that in the valve 12 the movable valve member 41 is normally held closed by the spring 42 and when the compressed air is admitted to said valve through the pipe 33, the valve member 41 will open, whereas the valve 31 is normally open and when compressed air is admitted thereto through the pipe 32 the valve will close.

The general operation of the apparatus hereinbefore specifically described is as follows:—Assuming that there are a plurality of molds for battery boxes in the system, all connected by inlet connections 20 and 21 to the main inlet pipe 17, and by discharge connections 23 and 24 to the main discharge pipe 11, and that the pipes 32 and 33 to the valves 31 and 12 respectively are open to permit both of said valves to function, water from the container 5 is withdrawn from said container by the pump 14 through the pipe 16 and forced by said pump through the pipe 17 to the various mandrels, and said water returns from said mandrels through the outlet main 11 and container 5. As the water passing through the inlet main 17 contacts with the control bulb 38 of the control mechanism B, if there is any increase in the temperature of the water within the system, when said temperature reaches a predetermined maximum, the diaphragm valve 31 will automatically close to prevent steam from being discharged into the container 5 and at the same time the diaphragm valve 12 will automatically open to admit fresh cool water from the service pipe 9 to the container 5 and said cool water will continue to enter said container until the temperature of the water therein is reduced sufficiently to cause the control mechanism B to again operate, this time to close the valve 12 and open the valve 31. While water is entering the container 5 from the service pipe 9, the excess water within the container will run out through the overflow pipe 7 into the drain 8.

When the conditions are such that it is desirable to intermittently admit cold water to the container 5 by the automatic operation of the valve 12 and there is no necessity of heating the water, the valve 31 is rendered inoperative by closing the hand-operated valve 34, while on the other hand, when the conditions are such that it is desirable to continuously admit heat to the water within the container 5 and no cold water is required, the valve 12 is rendered inoperative by closing the hand-operated valve 35.

While we have illustrated and described a mandrel for a mold for battery boxes as being the device which is maintained at a constant temperature by the apparatus of this invention it is evident that any device, machine, or apparatus, which is desirable to have maintained at a constant temperature may be so maintained by an apparatus as hereinbefore set forth, and it is evident that any suitable liquid may be employed as the temperature regulating medium without departing from the spirit of this invention.

We claim:

1. An apparatus of the character described comprising, in combination, a container, a cooling fluid within said container, a pipe adapted to supply said fluid to the container, a valve for said supply pipe, means to withdraw the fluid from the container and force the same to a device the temperature of which is to be regulated and from thence back into the container, and means interposed within a pipe leading from the container to the device to be regulated and exposed to the fluid circulating therebetween to operate the valve of the supply pipe, whereby the passage of fluid through the supply pipe to the container is controlled.

2. An apparatus of the character described comprising, in combination, a container, a cooling fluid within said container, a pipe adapted to supply said fluid to the container, a valve for said supply pipe, a pump for withdrawing the fluid from the container and forcing the same to a device the temperature of which is to be regulated and from thence back into the container, and an automatic temperature regulating mechanism exposed to the fluid circulating between the pump and device, adapted to operate the valve of the supply pipe, whereby the passage of the fluid through the supply pipe to the container is controlled.

3. An apparatus of the character described comprising, in combination, a container, water within said container, a pipe adapted to supply water to the container, a valve for said supply pipe, a pump for withdrawing water from the container and forcing the same to a device the temperature of which is to be regulated and from thence back into the container, an automatic temperature regulating mechanism exposed to the water circulating between the pump and device, adapted to operate the valve of the supply pipe, whereby the passage of water through the supply pipe to the container is controlled, a valve to automatically relieve excessive pressure between the pump and device, and means to conduct water released by said last-named valve back into the container.

4. An apparatus of the character described comprising, in combination, a container, water within said container, means to supply cooling water to the container, means to supply steam to the container, means to recirculate water between the container and a device, the temperature of which is to be regulated, and means exposed to the circulating water to control the passage of said water and steam through their respective supply means into the container.

5. An apparatus of the character described comprising, in combination, a container, water within said container, a pipe to supply cooling water to the container, a valve for said supply pipe, a pipe adapted to supply steam to the container, a valve for said last-named pipe, means to recirculate water between the container and a device, the temperature of which is to be regulated, and means exposed to the circulating water to operate either of said valves, whereby the passage of said water and steam through their respective pipes to the container is controlled.

6. An apparatus of the character described comprising, in combination, a container, water within said container, a pipe adapted to supply water to the container, an automatically operated valve for said water supply pipe, a pipe adapted to supply steam to the container, an automatically operated valve for said last-named pipe, means to recirculate water between the container and a device, the temperature of which is to be regulated, means exposed to the circulating water to operate the valve of said supply pipes, whereby the passage of water and steam through said pipes to the container is controlled, and another valve for each of the supply pipes, whereby each of the automatically operated valves may be rendered inoperative.

In testimony whereof we have hereunto set our hands.

THOMAS M. KNOWLAND.
HOWARD A. HANDS.